Patented Dec. 16, 1941

2,266,576

UNITED STATES PATENT OFFICE 2,266,576

TREATMENT OF RUBBER

William F. Tuley and Philip T. Paul, Naugatuck, Conn., assignors, by mesne assignments, to United States Rubber Company, New York, N. Y., a corporation of New Jersey No Drawing. Application March 17, 1938
Serial No. 196,370

3 Claims. (Cl. 260—809)

This invention relates to the treatment of rubber and similar oxidizable materials, and more particularly to a new class of deterioration retarders.

An object of the invention is to provide a new class of anti-oxidants or age resistors for organic substances which tend to deteriorate by absorption of oxygen from the air, for example goods of rubber or allied gums, unsaturated fatty oils such as unsaturated vegetable oils, essential oils, petroleum oils and their derivatives such as gasolines, soaps, aldehydes, synthetic resins, turpentine, paints and varnishes containing drying oils, and the like. A further object of the invention is to provide chemicals which additionally act as flex-improvers or anti-flex cracking agents for vulcanized rubber such as tire treads, which undergo repeated strains during use. Further objects will be apparent from the following description.

According to the invention, rubber and the like as aforesaid, is treated with a compound having the general formula

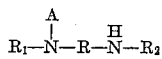

where R is an arylene group; $R_1$ and $R_2$ are each an aryl group; A is an alkyl radical. More specifically, R may be a substituted or unsubstituted arylene radical, and $R_1$ and $R_2$ a substituted or unsubstituted aryl radical, of the benzene, naphthalene, anthracene, acenaphthene, biphenyl, etc., series.

Where further substituted $R_1$, R and $R_2$ should preferably contain substantially non-negative substituents, among such being the following: methyl, ethyl, propyl, butyl, amyl, hexyl, heptyl, or any of the branch chain isomers of alkyl groups having more than two carbon atoms, methoxy, ethoxy, propoxy, butoxy, amyloxy, benzyloxy, aryl radicals including where phenyl is joined either to one carbon atom of a phenyl nucleus so as to form a biphenyl radical, or to two carbon atoms so as to form a naphthyl radical, cyclohexyl, cyclopentyl, alpha, beta or gamma pyridyl, alpha or beta furyl, unsaturated alkyls, mercapto, alkylated mercapto, etc.

Examples of A are the following, aryl substituted alkyl groups such as benzyl being included: methyl, ethyl, propyl, isopropyl, n-butyl, isobutyl, secondary butyl, tertiary butyl, amyl, hexyl, heptyl, or long chain alkyls such as dodecyl, benzyl, p-chlorobenzyl, p-hydroxy benzyl, beta hydroxy ethyl, beta ethoxy ethyl, beta ethylamino ethyl, beta diethyl amino ethyl, beta chloroethyl, etc.

The materials may be prepared by N-alkylation of a diaryl arylene diamine. Prior to N-alkylation, the groups other than the two amino groups may contain various substituents, e. g. alkyl, aryl, aralkyl, alkoxy, aryloxy, etc. Known alkylating agents may be used including inorganic acid esters of aliphatic hydroxy bodies. The mono-N-alkyl derivatives may also be derived from the N-alkyl substituted diarylamines, that is, the tertiary alkyl diarylamines, as illustrated by N-ethyl diphenylamine, and N-methyl diphenylamine; for example, N-methyl diphenylamine may be converted to 4-nitroso N-methyl diphenylamine (Cloëz, Comptes Rendus 124, 898) which can be reduced to N-methyl, N-phenyl p-phenylene diamine by treatment with excess stannous chloride. The acetyl derivative of the amine may be condensed with iodobenzene (Wieland, Ber. 41, 3493) and the resulting acetyl derivative hydrolyzed with alcoholic potassium hydroxide.

The products of reaction which are predominantly composed of the mono-N-alkyl diarylarylene diamines may be used, or the mono-N-alkyl diaryl-arylene diamine compound may be purified for use as by separation from any associated products of reaction such as the N,N'-dialkyl diaryl-arylene diamines. Mixtures of these two types of materials may also be used and particularly the materials containing the higher N,N'-dialkylated members of the formula

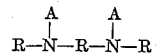

where A is propyl, butyl, amyl, hexyl, heptyl, etc., R representing the aromatic nucleus. The branched-chain isomers such as the N,N' di-isopropyl, compounds wherein the chain contains more than two carbon atoms, are particularly useful as having substantially non-discoloring characteristics.

Among other examples coming within the scope of the present invention and useful for the purpose are the following:

N-methyl N,N'-diphenyl p-phenylene diamine
N-ethyl N,N'-diphenyl p-phenylene diamine
N-methyl N,N'-di p-anisyl p-phenylene diamine
N-propyl N,N'-diphenyl p-phenylene diamine
N-benzyl N,N'-diphenyl p-phenylene diamine
N-methyl N,N'-di beta naphthyl p-phenylene diamine
N-methyl N,N'-di-ortho tolyl p-phenylene diamine
N-methyl N,N'-diphenyl 2-5 tolulyene diamine
N-methyl N,N'-diphenyl 1,4 diamino-naphthalene
N-ethyl N,N'ditolyl 1-8 naphthalene diamine
N-propyl N,N'-dianisyl benzidine
N-ethyl N,N'-diphenyl p-phenylene diamine
N-butyl N,N'-diphenyl p-phenylene diamine
N-methyl N,N'-diphenyl o-phenylene diamine
N-ethyl N,N'-di p-anisyl m-phenylene diamine
N-methyl N,N'-di p-cyclohexyl phenyl p-phenylene diamine The materials have special and outstanding properties in connection with the preservation of rubber and vulcanized rubber goods whereby to protect the same against deterioration caused by heat, light, oxygen, flexing, etc. The effectiveness of chemicals as described herein for retarding oxidation of rubber is illustrated by the results of standard accelerated aging tests on commercial rubber compounds. For example, tests were made on the following tread compounds. The parts are by weight. The mixed master batch used is as follows:

|  | Parts |
|---|---|
| Smoked sheets | 100 |
| Carbon black | 45 |
| Zinc oxide | 5 |
| Pine tar | 3.50 |
| Zinc soap of cocoanut oil acids | 3.50 |
| Sulphur | 3.00 |
| Mercaptobenzothiazole (accelerator) | 1.00 |

To portions of this master batch the anti-oxidants were added in proportions indicated in the following table which tabulates the percent remaining tensile after ageing 96 hours under 300 pounds oxygen at 70° C.

|  | Control | N-methyl N,N'-diphenyl p-phenylene diamine (approx. 0.5 part) |
|---|---|---|
| Unaged | 100 | 100 |
| Aged | 15 | 58 |

|  | Control | N-ethyl N,N'-diphenyl p-phenylene diamine (approx. 1.0 part) |
|---|---|---|
| Unaged | 100 | 100 |
| Aged | 33 | 61 |

|  | Control | N-methyl N,N'-dibeta naphthyl p-phenylene diamine (approx. 1.0 part) |
|---|---|---|
| Unaged | 100 | 100 |
| Aged | 25 | 50 |

|  | Control | N-methyl N,N'-di p-anisyl p-phenylene diamine (approx. 1.0 part) |
|---|---|---|
| Unaged | 100 | 100 |
| Aged | 25 | 57 |

|  | Control | N-benzyl N,N'-diphenyl p-phenylene diamine (approx. 1.0 part) |
|---|---|---|
| Unaged | 100 | 100 |
| Aged | 33 | 46 |

|  | Control | N-propyl N,N'-diphenyl p-phenylene diamine (approx. 1.0 part) |
|---|---|---|
| Unaged | 100 | 100 |
| Aged | 33 | 63 |

|  | Control | N-methyl N,N'-diphenyl 2-5 tolulyene diamine (approx. 1.0 part) |
|---|---|---|
| Unaged | 100 | 100 |
| Aged | 33 | 44 |

Stocks containing the above anti-oxidants were also superior to the control in resisting deterioration due to heat or repeated flexing. Incident to their use in paints and varnishes as aforesaid the materials act as anti-oxidation controllers to regulate the rate of drying of finishes therefrom which dry by oxidation.

The N-mono alkyl derivatives subject of the present invention, are more soluble in most organic solvents and in rubber than the corresponding diaryl-arylene diamines, and may be used in higher ratios in rubber without causing an objectionable "bloom," such as accompanies the use of the corresponding diaryl-arylene diamines. These non-blooming anti-oxidants are therefore more effective for retarding the ageing and flex-cracking of vulcanized rubber compared with the corresponding diaryl arylene diamines.

The invention may be applied to the preservation of natural rubbers as well as artificially prepared rubbers including reclaims and latices of such rubbers.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersion or solutions either in powder, paste or solution form, or applied in such forms for incorporation by diffusion, to the surfaces of vulcanized or unvulcanized rubber goods.

Having thus described our invention, what we claim and desire to protect by Letters Patent is:

1. A process of inhibiting the deterioration of rubber including increasing its resistance to flex-cracking which comprises treating the same with a mono-N-methyl diaryl-arylene diamine.

2. A process of inhibiting the deterioration of rubber including increasing its resistance to flex-cracking which comprises incorporating with the rubber N-methyl N,N'-diphenyl phenylene diamine.

3. A vulcanized rubber product containing prior to vulcanization an anti-oxidant having the general formula

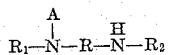

where A is a methyl radical; R is an arylene group; and $R_1$ and $R_2$ are each an aryl group.

WILLIAM F. TULEY.
PHILIP T. PAUL.